United States Patent
Olshanechky et al.

(10) Patent No.: US 10,120,994 B1
(45) Date of Patent: Nov. 6, 2018

(54) DEVICE AND METHOD FOR AUTHORIZING A COLOR CHANGE OF AN APPAREL DEVICE

(71) Applicant: MOTOROLA SOLUTIONS, INC., Chicago, IL (US)

(72) Inventors: Oleg Olshanechky, Petah Tikva (IL); Tony Taboch, Jerusalem (IL); Jonathan Daniel Giber, Jerusalem (IL); Matan Cohen, Mevaseret Tziyon (IL); Irakliy Papiashvily, Ashkelon (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/687,741

(22) Filed: Aug. 28, 2017

(51) Int. Cl.
   *G06F 21/35* (2013.01)
   *A41D 31/00* (2006.01)
   *G02F 1/23* (2006.01)
   *H02J 7/00* (2006.01)

(52) U.S. Cl.
   CPC ......... *G06F 21/35* (2013.01); *A41D 31/0005* (2013.01); *G02F 1/23* (2013.01); *H02J 2007/0001* (2013.01)

(58) Field of Classification Search
   CPC ... G06F 21/35; G06F 1/1652; A41D 31/0005; G02F 1/23; H02J 2007/0001; G09G 5/04; A43B 3/0005
   See application file for complete search history.

(56) References Cited

U.S. PATENT DOCUMENTS

| | | | |
|---|---|---|---|
| 9,823,698 B2* | 11/2017 | Laycock | G06F 1/163 |
| 2004/0181692 A1* | 9/2004 | Wild | H04W 48/14 |
| | | | 726/4 |
| 2004/0187184 A1* | 9/2004 | Rubin | A41D 27/085 |
| | | | 2/69 |
| 2006/0005032 A1* | 1/2006 | Cain | H04L 63/105 |
| | | | 713/182 |
| 2015/0227164 A1* | 8/2015 | Laycock | G06F 1/163 |
| | | | 345/82 |
| 2016/0041581 A1* | 2/2016 | Piccionelli | G06F 1/163 |
| | | | 345/156 |
| 2017/0052749 A1* | 2/2017 | Lee | A41D 1/00 |

(Continued)

OTHER PUBLICATIONS https://youtu.be/uzZTBHfpEOs—published May 2016.
https://youtu.be/3jwzoXwFXn8—published May 13, 2013.
https://youtu.be/lUcLCJTqbp8—published Jul. 22, 2016.

*Primary Examiner* — Nathan Mitchell
(74) *Attorney, Agent, or Firm* — Perry + Currier, Inc.

(57) ABSTRACT

A device and method for authorizing a color change of an apparel device is provided. The apparel device is configured to at least partially change a color state upon a change of power. A power supply is coupled to the apparel device and configured to control the power to the apparel device. A controller is coupled to the power supply and a communication interface. The controller is configured to: transmit, to an authenticating device, using the communication interface, a request for an authorization to change the color state of the apparel device; receive, from the authenticating device, using the communication interface, the authorization; and control the power supply to supply a given power to the apparel device, thereby changing the color state from a default color state to a given color state.

20 Claims, 8 Drawing Sheets

(56) References Cited

U.S. PATENT DOCUMENTS

2017/0110088 A1\* 4/2017 Dickinson ................ G09G 5/04
2017/0262884 A1\* 9/2017 Miller ...................... A41D 1/04
2017/0302447 A1\* 10/2017 Nix ................... H04W 52/0235

\* cited by examiner

DEVICE AND METHOD FOR AUTHORIZING A COLOR CHANGE OF AN APPAREL DEVICE

BACKGROUND OF THE INVENTION

Authentication and/or authorization of uniforms, for example, for use by first responders, is a growing problem. For example, theft and/or counterfeiting of uniforms may allow a criminal, wearing a stolen or counterfeit uniform, to enter restricted areas and/or perform criminal acts under the guise of being a first responder, such a police officer and the like. Such theft and/or counterfeiting may lead to increased cost in security at first responder uniform storage units and/or at public events to attempt to prevent theft and/or criminal acts. Furthermore, such increased cost of security may result in more technically complex security systems being installed at uniform storage units, which may increase overhead on processing resources, sensor deployment, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
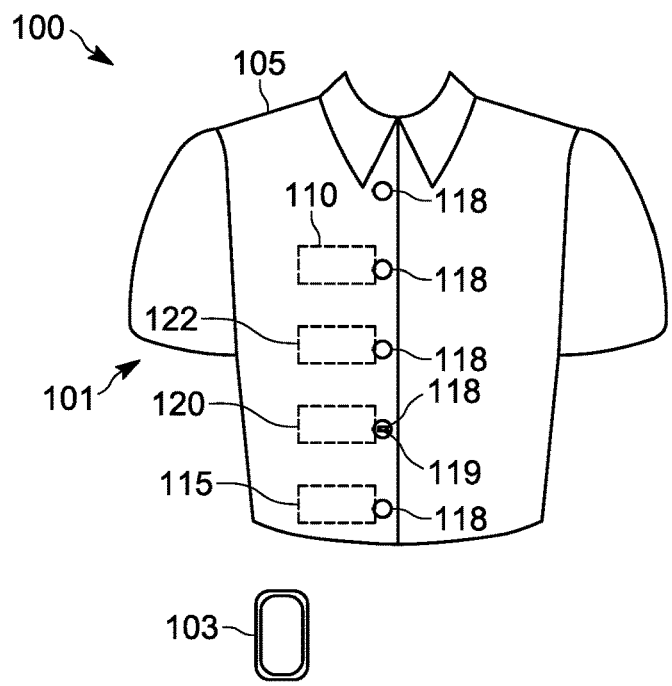
FIG. 1 is a schematic diagram of a system authorizing a color change of an apparel device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: an apparel device configured to at least partially change a color state upon a change of power; a power supply coupled to the apparel device and configured to control the power to the apparel device; a communication interface; and a controller coupled to the power supply and the communication interface, the controller configured to: transmit, to an authenticating device, using the communication interface, a request for an authorization to change the color state of the apparel device; receive, from the authenticating device, using the communication interface, the authorization; and control the power supply to supply a given power to the apparel device, thereby changing the color state from a default color state to a given color state.

Another aspect of the specification provides a method comprising: transmitting, from a controller to an authenticating device, using a communication interface, a request for an authorization to change the color state of an apparel device, apparel device configured to at least partially change a color state upon a change of power; receiving, at the controller from the authenticating device, using the communication interface, the authorization; and controlling, using the controller, a power supply to supply a given power to the apparel device, thereby changing the color state from a default color state to a given color state.

Figure 2:
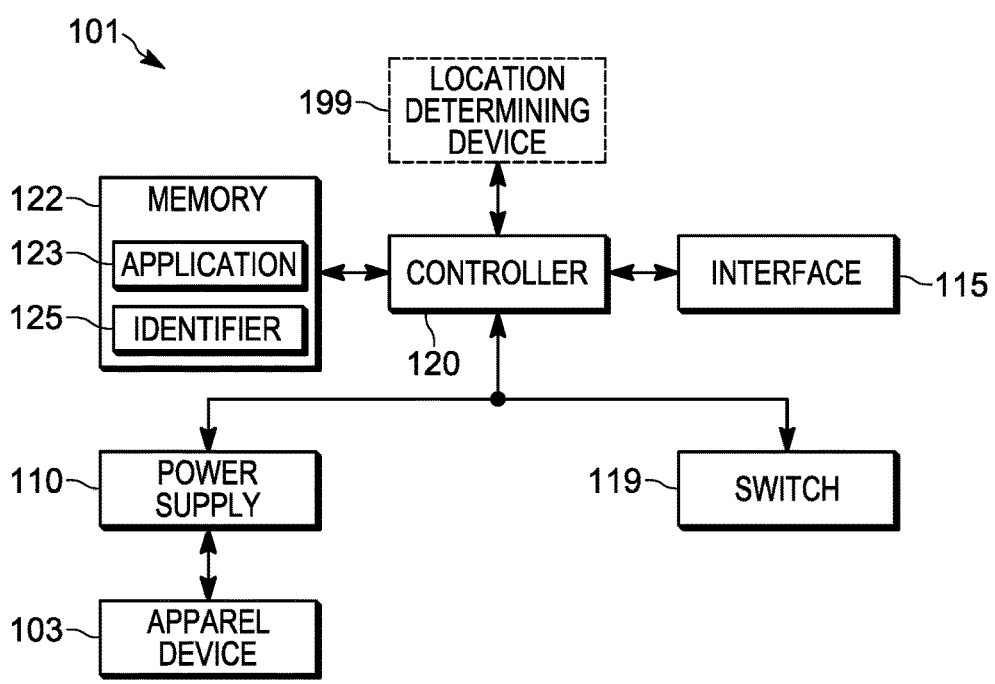
FIG. 2 is a block diagram of a device for authorizing a color change of an apparel device in accordance with some embodiments.

Attention is directed to FIG. 1 and FIG. 2 which respectively depict: a block diagram of a system 100 that includes a device 101 configured for communication with an authenticating device 103; and a block diagram of the device 101. The device 101 comprises: an apparel device 105 configured to at least partially change a color state upon a change of power; a power supply 110 coupled to the apparel device 105 and configured to control the power to the apparel device 105; a communication interface 115 (interchangeably referred to hereafter as the interface 115); and a controller 120 coupled to the power supply 110 and the communication interface 115, the controller 120 configured to: transmit, to the authenticating device 103, using the communication interface 115, a request for an authorization to change the color state of the apparel device 105; receive, from the authenticating device 103, using the communication interface 115, the authorization; and control the power supply 110 to supply a given power to the apparel device 105, thereby changing the color state from a default color state to a given color state. For example, as will be described below, changing a color state of the apparel device 105 generally comprising changing a color of the apparel device 105. Furthermore, the controlling the power supply 110 to supply a given power to the apparel device 105 may include one or more of: changing the color state of the apparel device 105 from a first color state to a second color state; changing the color of the apparel device 105 from a default color to a given color state; and changing the color of the apparel device 105 from a first color to a second color. Indeed, hereafter the terms the terms default color state, default color, first color state and first color will be used interchangeably; and similarly the terms given color state, given color, second color state and second color will be used interchangeably.

As further depicted in FIG. 1, the apparel device 105 is in the form of shirt that includes at least one button 118 (as depicted, five buttons), and wherein the at least one button 118 is configured to fasten two portions of the apparel device 105 together. As depicted, at least one of the buttons 118 includes a switch 119 for operating the device 101 (e.g. turning the device 101 on and off).

As further depicted, in FIG. 1 and FIG. 2, the device 101 may further comprise a memory 122 which stores an application 123, and alternatively authentication data 125, for example an identifier of the authenticating device 103 and/or pairing data and/or a password and the like. However, such authentication data 125 may be stored as a component of the application 123. Furthermore, the authenticating device 103 may store similar authentication data 125.

As depicted in FIG. 1, each of the power supply 110, the interface 115, the controller 120 and the memory 122 are depicted using broken lines indicating that they are not visible at an external surface of the apparel device 105. For example, each of the power supply 110, the interface 115, the controller 120 and the memory 122 may be located on an inside surface of the apparel device 105.

Furthermore, while each of the power supply 110, the interface 115, the controller 120 and the memory 122 are depicted in FIG. 1 as distinct physical components, at least two of the power supply 110, the interface 115, the controller 120 and the memory 122 may be physically integrated into a single housing and/or package, for example as components of a wireless micro device. In particular, the interface 115, the controller 120 and the memory 122 may be integrated into a single housing and/or package, and the power supply 110 may integrated into a second housing and/or package. Regardless, each of the power supply 110, the interface 115, the controller 120 and the memory 122 are interconnected and/or coupled together, for example as depicted in FIG. 2.

With reference to FIG. 1, in some embodiments, the power supply 110, the interface 115, the controller 120 and the memory 122 may be at least partially located and/or integrated into at least one button 118. For example, as depicted, each of the power supply 110, the interface 115, the controller 120 and the memory 122 is at least partially located and/or integrated into at least one respective button 118. As depicted, the power supply 110, the interface 115, the controller 120 and the memory 122 are partially integrated into a respective button (e.g. to provide some physical support for each), and partially located on an inside surface of the apparel device 105.

Hence, the power supply 110, the interface 115, the controller 120 and the memory 122 may comprises components which are one or more of miniaturized and adapted for at least partial integration into at least one button 118.

Indeed, the power supply 110, the interface 115, the controller 120 and/or the memory 122 may be at least partially located and/or integrated into any type of accessory of the apparel device 105 including, but not limited to, pins, badges, epaulets, and the like.

Furthermore, one of the buttons 118 includes the switch 119. For example, as will be described below, the switch 119 may be actuated, for example by a user of the device 101, to turn the device 101 on and/off. For example, the switch 119 may control power from a battery to the remainder of the electrical components of the device 101; when the switch 119 is "OFF", no power and/or voltage and/or no current will be supplied to the apparel device 105 and the apparel device 105 is in a default color state and/or a first color state and/or a first color.

The apparel device 105 generally comprises a color change fabric (and/or color change threads and the like) that changes a color and/or a color state when power to the color change fabric is changed. For example, the color change fabric may comprise conductive threads coated, and/or individually coated, with a thermochromic material and/or a thermochromic paint, and the like; when electricity and/or power and/or a voltage and/or a current is supplied to the threads, the threads heat up and change color. However, other types of color change fabric, and the like, are within the scope of present embodiments.

For example, as depicted, the apparel device 105 comprises a shirt (including, but not limited to, a first responder uniform), at least a portion of the shirt made from the color change fabric. When no power and/or zero power and/or a default voltage (e.g. a power and/or voltage supplied by the power supply 110 when the power supply 110 is off and/or initially turned on) is applied to the color change fabric, the color change fabric is in a default color state. When a given power is supplied to the color change fabric, the color change fabric changes to a given color state and/or a second color state and/or a second color. In other words, when zero power and/or a default power and/or zero voltage and/or a default voltage and/or zero current and/or a default current supplied by the power supply 110, at least a portion of the apparel device 105 is in a default color state and/or a first color state and/or has a default color and/or first color, and when a given power and/or given voltage and/or given current is supplied by the power supply 110, the at least a portion of the apparel device 105 changes to a given color state and/or a second color state and/or a second color.

In some embodiments, the given color state and/or a second color state and/or a second color may comprise a color state and/or a color that is authorized and/or approved by a first responder authority, and the default color state and/or the default color and/or the first color may comprise a color state and/or a color that is not authorized and/or not approved by the first responder authority.

For example, the given color state may include a blue color that is specified as a color of a shirt to be worn by police officers, while the default color state may include a color that is different from the color of a shirt to be worn by police officers, for example yellow, green, purple, etc. Hence, as will be described below, unless the device 101 is authorized to change the color state of the apparel device 105 from the default color to the given color, the apparel device 105 will be recognizable as being of a color that is not associated with an authentic police officer, and the device 101 may hence be visually recognizable as being stolen.

In some embodiments, as described below, the entire apparel device 105 may change color states upon a change of power and/or voltage and/or current. However, in other embodiments, the apparel device 105 is configured to at least partially change the color state upon the change of the power and/or voltage and/or current by changing the color state of one or more of a pattern and a symbol at the apparel device 105. In other words, color change threads may be located only at a portion of the apparel device 105 and may be in shape of a pattern and/or a symbol, and only the portion of the apparel device 105 corresponding to the pattern and/or the symbol may change color upon a change of power and/or voltage and/or current.

Furthermore, while the apparel device 105 is depicted as a shirt, the apparel device 105 may include any type of apparel device including, but not limited to, one or more of fabric, clothing, a shirt, pants, a belt, gloves, a coat, a dress, a uniform, a patch, a badge, shoes, and a hat.

The device 101 includes the power supply 110 coupled to the apparel device 105, the power supply 110 configured to control the power and/or voltage and/or current to the apparel device 105. In particular, the power supply 110 is coupled to the color change fabric and/or the threads of the color change fabric and is further coupled to the controller 120 which controls the power supply 110 to supply a power and/or a voltage and/or current to the color change fabric to change a color thereof.

The power supply 110 hence includes any suitable power supply configured to provide at least a given power and/or a given voltage and/or a given current to the apparel device 105, as well as either supply zero power and/or zero voltage and/or zero current, a default power and/or default voltage and/or default current, or stop providing any power and/or voltage and/or current to the apparel device 105. The power supply 110 is further configured to receive commands from the controller 120 to change the power and/or voltage and/or current supplied to the apparel device 105 between the default power (e.g. zero power and/or zero voltage and/or zero current, and/or no power and/or no voltage and/or no current) and the given power/voltage/current. Hence, while not depicted, the power supply 110 may further include a respective controller and/or processor configure to communicate with the controller 120 and, in turn control the power supply 110 to control a power/voltage/current to the apparel device 105.

Indeed, hereafter, when the power supply 110 is described as controlling a power supplied to the apparel device 105, the power supply 110 can control one or more of: power, voltage and current supplied to the apparel device 105.

In particular, the power supply 110 generally includes a battery, a power pack and the like. In particular, the battery, power pack and the like of the power supply 110 is generally rechargeable; hence, when the device 101 is stored, for example, in a first responder storage room (e.g. a police station, and the like), the power supply 110 may be recharged in preparation for a next use.

The power supply 110 may further supply power, and the like, to a remainder of the components of the device 101; in these embodiments, the switch 119 may control the power supply 110 to turn the device 101 on and off. However, in other embodiments, the device 101 comprises a second power supply which supplies power to the communication interface 115 and the controller 120; in these embodiments, the switch 119 may control the second power supply to turn the device 101 on and off. The switch 119 hence comprises any suitable switch, mechanical and otherwise, for turning the device 101 on and off.

The device 101 further includes the interface 115 configured to communicate with the authenticating device 103, for example, in a personal area network (PAN), and the like. The interface 115 may generally comprise a PAN interface and/or a PAN transceiver including, but not limited to, a Bluetooth™ interface and/or a Bluetooth™ transceiver, an IEEE 802.15 interface and/or an IEEE 802.15 transceiver, and/or an infrared data association interface and/or an infrared data association 802.15 transceiver. Alternatively, and/or in addition to, the interface 115 may comprise a radio frequency identification (RFID) reader and/or an RFID device transceiver and/or RFID interface, and the like.

In some embodiments, the interface 115 may be further configured to broadcast an alert, and the like outside on a local area network, a radio network, a cell phone network, and the like. For example, the interface 115 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications. In yet further embodiments, the interface 115 may includes one or more local area network or personal area network transceivers operating, for example, in accordance with an IEEE 902.11 standard (e.g., 902.11a, 902.11b, 902.11g).

It is further appreciated that the authenticating device 103 includes a similar communication interface. Hence, the devices 101, 103 are generally configured to communicate when in proximity to each other. However, when the devices 101, 103 are not in proximity to each other (for example outside of a communication range of their respective communication interfaces), the devices 101, 103 do not communicate. Hence, together, the devices 101, 103 may form a personal area network.

In particular, the devices 101, 103 are paired such that, when in proximity to one another, the authenticating device 103 may authenticate the device 101 and/or authorize the device 101 to at least partially change the color of the apparel device 105. However, when the devices 101, 103 are not in proximity to each other, the authenticating device 103 may not authenticate the device 101 and/or authorize the device 101 to at least partially change the color of the apparel device 105

For example, as depicted in FIG. 2, the memory 122 stores authentication data 125, for example an identifier of the authenticating device 103 (e.g. a media access control (MAC) identifier, an RFID identifier, and the like) and/or an identifier of a user of the devices 101, 103 (e.g. a badge number, and the like, of a first responder) and/or a password, and the like. While not depicted, a respective memory of the authenticating device 103 may store respective authentication data. In general, the authentication data 125 enables the authenticating device 103 to authenticate the device 101 and/or authorize a color change of the apparel device 105. It is assumed herein that provisioning of respective authentication data at the devices 101, 103 and/or pairing of the devices 101, 103 has been previously performed in a provisioning process, for example to establish a personal area network therebetween. The respective authentication data at the devices 101, 103 and/or pairing of the devices 101, 103 may enable the devices 101, 103 to establish such a personal area network each time the devices 101, 103 are in proximity to each other.

Indeed, such an establishment of a personal area network may include the devices 101, 103 authenticating each other through the exchange of authentication data. Such an authentication may inherently include the authenticating device 103 authorizing the device 101 to control the apparel device 105 to change color states.

The controller 120 includes one or more logic circuits, one or more processors, one or more microprocessors, one or more ASIC (application-specific integrated circuits) and one or more FPGA (field-programmable gate arrays). In some embodiments, the controller 120 and/or the device 101 is not a generic controller and/or a generic device, but a device specifically configured to implement color change authorization functionality. For example, in some embodiments, the device 101 and/or the controller 120 specifically comprises a computer executable engine configured to implement specific color change authorization functionality.

The memory 122 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 2, programming instructions (e.g., machine readable instructions) that implement the functional teachings of the device 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to implement color change authorization functionality associated with the application 123. In the illustrated example, when the controller 120 executes the application 123, the controller 120 is enabled to: transmit, to the authenticating device 103, using the communication interface 115, a request for an authorization to change the color state of the apparel device 105; receive, from the authenticating device 103, using the communication interface 115, the authorization; and control the power supply 110 to supply a given power to the apparel device 105, thereby changing the color state from a default color state to a given color state.

The device 101 may include other components, including, but not limited to an optional location determining device 199 including, but not limited to, one or more of a Global Positioning System (GPS) device, a Globalnaya Navigazionnaya Sputnikovaya Sistema (GLONASS) device, a triangulation device, and the like, such that the device 101 may determine a location thereof, and further transmit the location in an alert, and the like, as described below. The location determining device 199 is optional as indicated by the location determining device 199 being depicted in broken lines.

Furthermore, it is assumed in the present specification that the devices 101, 103 have been previously paired, for example in a provisioning process to store respective authentication data as described above.

It is further assumed that the authenticating device 103 is configured to authenticate a user, and the like, and/or that the authenticating device 103 is configured to perform an authentication process prior to use and/or prior to authorizing the device 101 to change the color of the apparel device 105. For example, the authenticating device 103 may comprise a wireless communication device (e.g. for use by first responders) that is configured to implement a secure log-in process and/or an authorization process and/or an authentication process, for example through the use of passwords, fingerprint readers, and the like, before a user may use the authenticating device 103.

Furthermore, it is assumed that the authenticating device 103 comprises a respective controller, memory, and communication interface respectively similar to the controller 120, the memory 122 and the interface 115, adapted, however, for a type of the authenticating device 103. Hence, the devices 101, 103 are further generally configured to communicate with each other.

The authenticating device 103 may be further configured to perform at least a portion of the secure log-in process and/or an authorization process and/or an authentication process by communicating with a remote device (not depicted) such as a server and the like, using a wireless (and/or wired) communication interface.

Furthermore, while the authenticating device 103 is depicted as a wireless communication device (e.g. a mobile communication device and/or mobile radio), the authenticating device 103 may be configured according to any physical platform including, but not limited to, a gun (e.g. having a fingerprint reader), a radio, and the like, at which a secure log-in process and/or an authorization process and/or an authentication process may be implemented. Indeed, the authenticating device 103 may further include a vehicle.

Regardless, the authenticating device 103 may be specifically associated with a user of device 101 such that the user may log-in at the authenticating device 103 and furthermore cause the authenticating device 103 to automatically change color once the authenticating device 103 authenticates and/or authorizes the device 101 as described hereafter.

Furthermore, each of the devices 101, 103 may be further configured to implement a respective authorization timer. In particular, once the device 101 transmits a request for authorization to the authenticating device 103, the device 101 waits a given time period as indicated by the respective authorization timer. When the authorization is not received from the authenticating device 103 within the given time period, the controller 120 determines that the authorization process has failed and controls the power supply 110 to maintain a default power and/or zero power and/or stop providing power to the apparel device 105.

Similarly, the authenticating device 103 may also transmit an authorization request to the device 101, and wait a respective given time period as indicated by the respective authorization timer. When a respective authorization is received from the device 101 within the given time period, the controller at the authenticating device 103 may transmit an authorization success indicator to the device 101; otherwise when the respective authorization is not received from the device 101 within the given time period, the controller at the authenticating device 103 either does not transmit the authorization success indicator to the device 101 and/or transmits an authorization failure indicator to the device 101. Either way, in these embodiments, the controller 120 at the device 101 may not control the power supply 110 to cause the apparel device 105 to change to the given color state until the authorization success indicator is received from the device 101.

Figure 3:
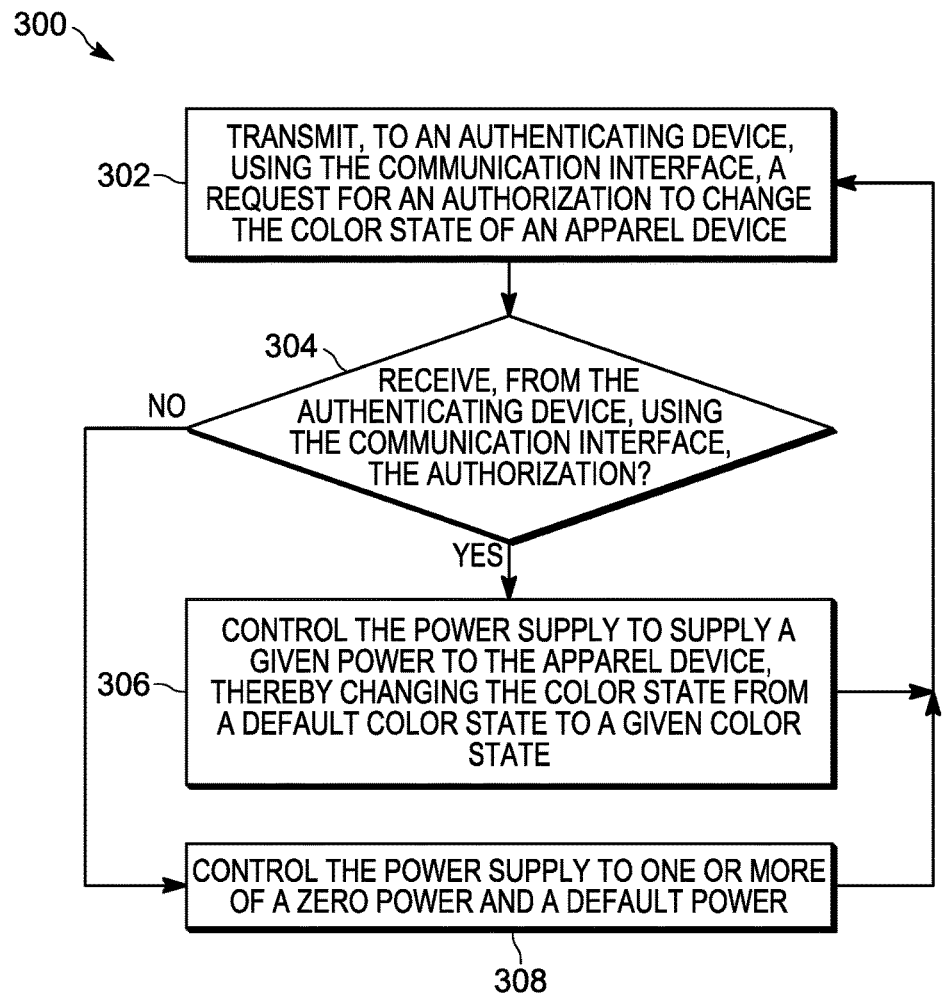
FIG. 3 is a flowchart of a method of authorizing a color change of an apparel device in accordance with some embodiments.

Attention is now directed to FIG. 3 which depicts a flowchart representative of a method 300 for implementing color change authorization functionality. In some embodiments, the operations of the method 300 of FIG. 3 correspond to machine readable instructions that are executed by, for example, the device 101 of FIG. 1, and specifically by the controller 120 of the device 101. In the illustrated example, the instructions represented by the blocks of FIG. 3 are stored at the memory 122, for example, as the application 123. The method 300 of FIG. 1 is one way in which the device 101 and/or the controller 120 is configured. Furthermore, the following discussion of the method 300 of FIG. 3 will lead to a further understanding of the device 101, and its various components.

However, it is to be understood that the device 101 and/or the controller 120 and/or the method 300 may be varied, and need not work exactly as discussed herein in conjunction with each other, and that such variations are within the scope of present embodiments.

Furthermore, the method 300 of FIG. 3 need not be performed in the exact sequence as shown and likewise various blocks may be performed in parallel rather than in sequence. Accordingly, the elements of method 300 are referred to herein as "blocks" rather than "steps".

At a block 302, the controller 120 transmits, to the authenticating device 103, using the communication interface 115, a request for an authorization to change the color state (and/or the color) of the apparel device 105.

At a block 304, the controller 120 determines whether or not the authorization is received, from the authenticating device 103, using the communication interface 115.

When the authorization is received from the authenticating device 103 (e.g. a "YES" decision at the block 304), at a block 306 the controller 120 controls the power supply 110 to supply a given power to the apparel device 105, thereby changing the color state (and/or the color) from a default color state (and/or a default color and/or a first color state and/or a first color) to a given color state (and/or a given color and/or a second color state and/or a second color).

Otherwise, when the authorization is not received from the authenticating device 103 (e.g. a "NO" decision at the block 304), at a block 308 the controller 120 controls the power supply 110 to remain at one or more of a zero power and a default power. In other words, in some embodiments, the power supply 110 does not provide and/or stops providing power to the apparel device 105.

In some embodiments, after the block 306 or the block 308, the method 300 may repeat, for example, periodically. Hence, for example, after the apparel device 105 has been controlled to the given color state at the block 306, the controller 120 may again, at the block 302, transmit, to the authenticating device 103, using the communication interface 115, a further request for a further authorization and again, at the block 304, determines whether or not a further authorization is received from the authenticating device 103. When the further authorization is received, at the block 306, the controller 120 controls the power supply 110 to maintain the given power.

However, when the further authorization is not received, at the block 308, the controller 120 controls the power supply 110 to change the given power to one or more of a zero power and a default power, and/or stops providing power to the apparel device 105, thereby changing the color state of the apparel device from the given color state back to the default color state. In some of these embodiments, the power supply 110 stops providing power to the apparel device 105 to change the apparel device 105 to a default color state (e.g. to preserve battery life). Hence, for example, when the devices 101, 103 become separated after an initial authorization, the apparel device 105 changes color back to the default color state.

Figure 4:
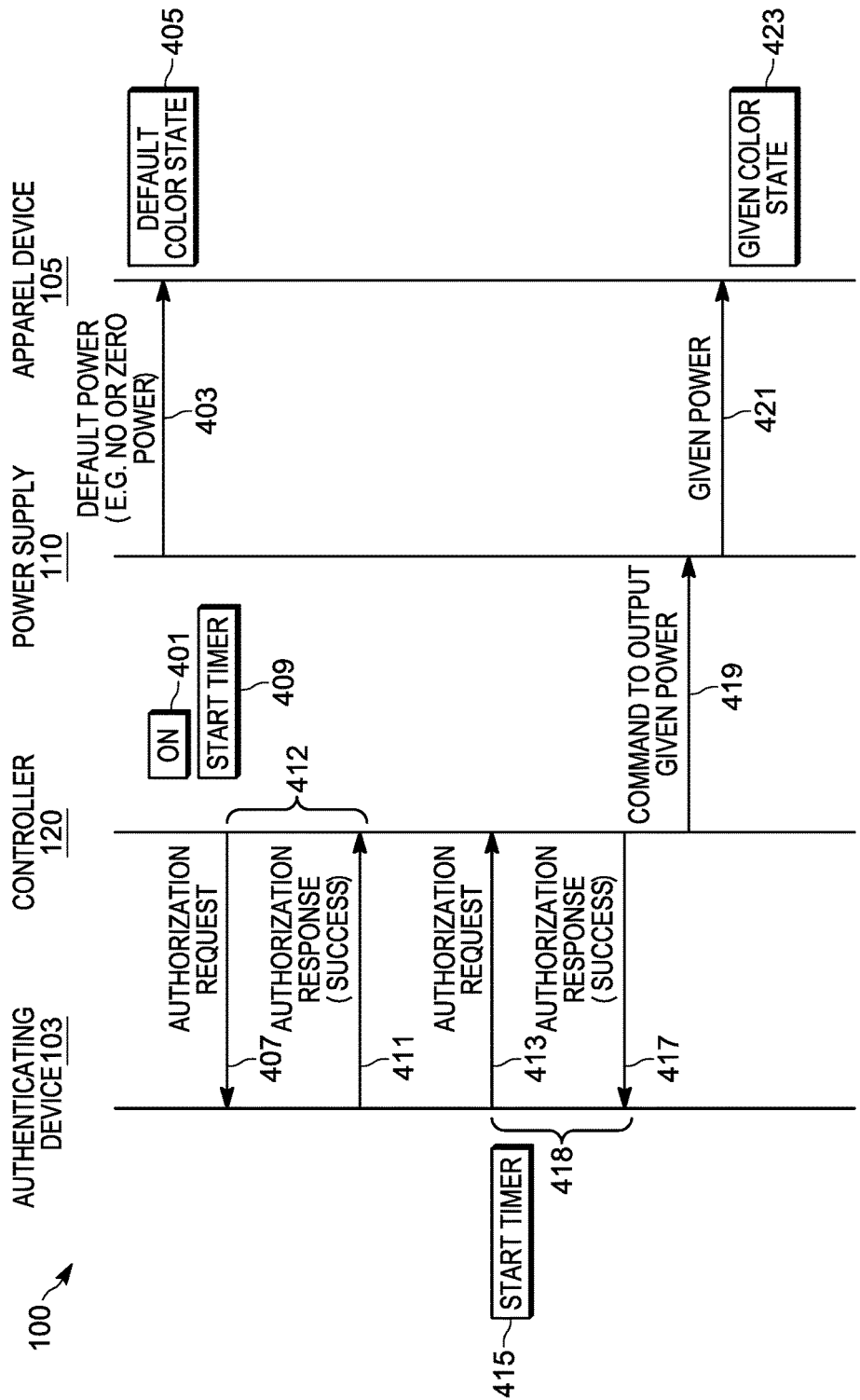
FIG. 4 shows a signal flow diagram showing authorization of a color change of an apparel device in accordance with some embodiments.
Figure 6:
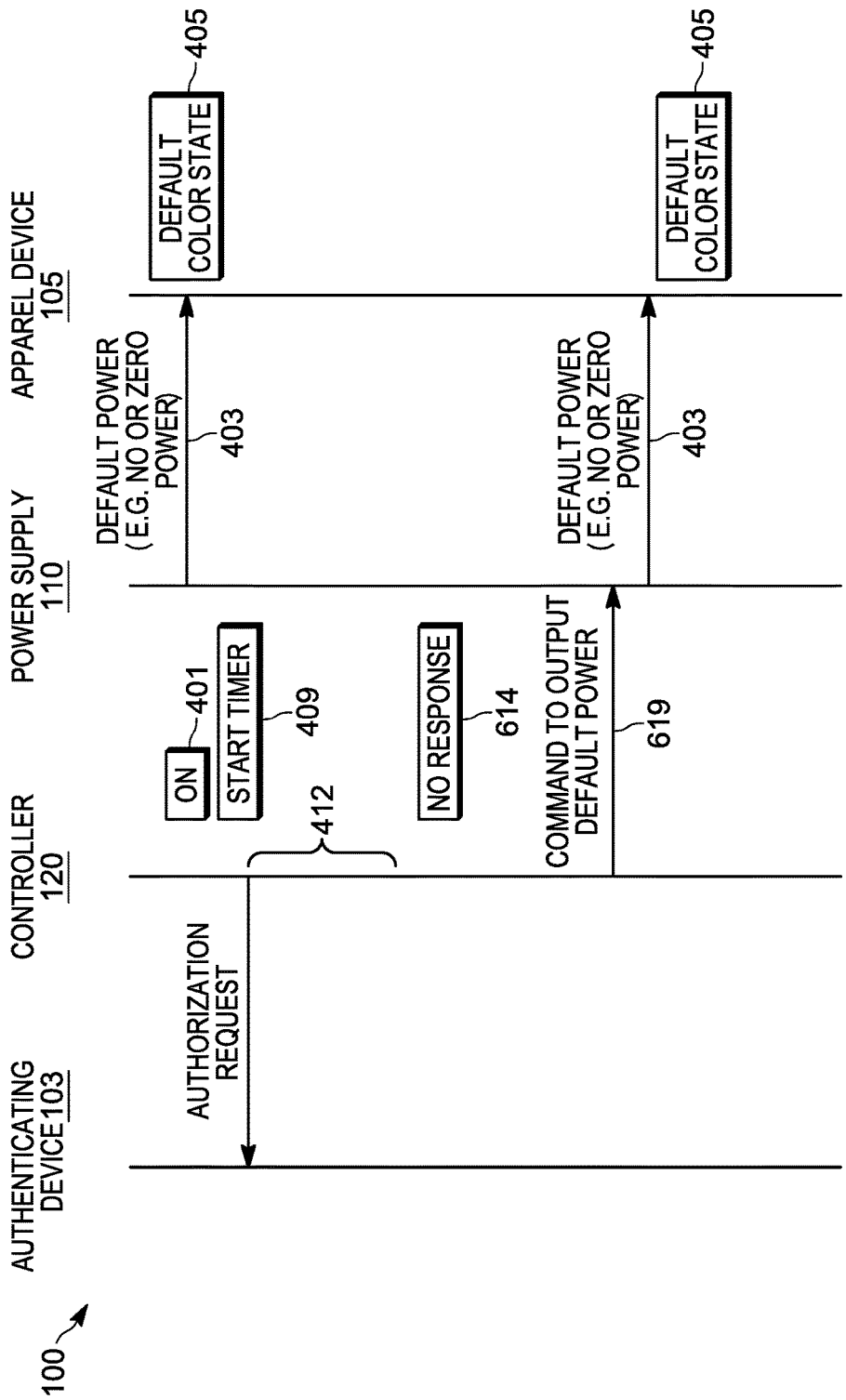
FIG. 6 shows a signal flow diagram showing authorization for color change of an apparel device not being received in accordance with some embodiments.
Figure 7:
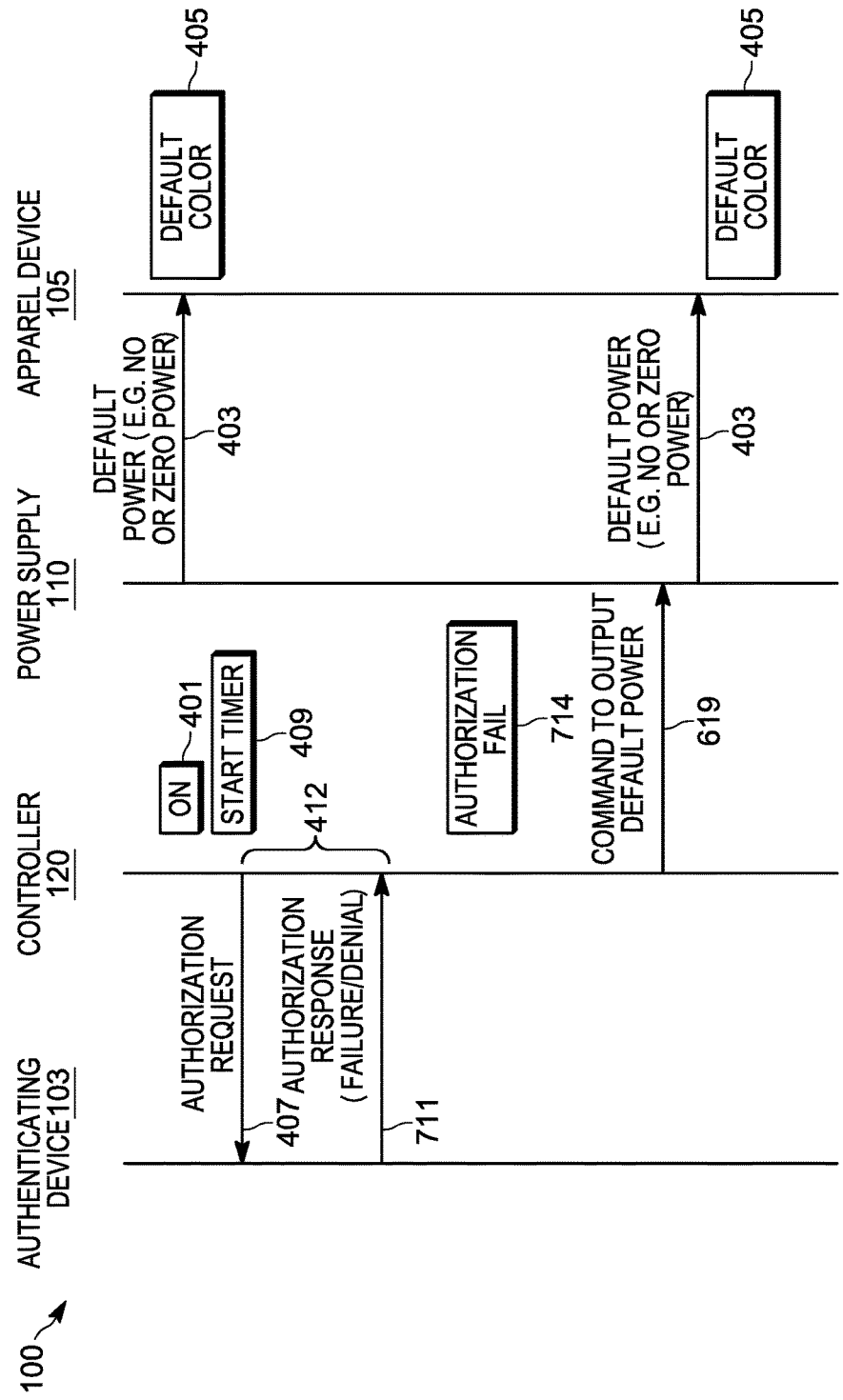
FIG. 7 shows a signal flow diagram showing authorization for color change of an apparel device being denied in accordance with some embodiments.

Examples of the method 300 will now be described with reference to FIG. 4 to FIG. 8. In particular, FIGS. 4, 6 and 7 depict signal flow diagrams between the authenticating device 103, the controller 120, the power supply 110 and the apparel device 105. FIG. 4 depicts an embodiment where, at the block 304, a "YES" decision occurs and hence authentication between the devices 101, 103 is successful. FIG. 6 and FIG. 7 each depict embodiments where, at the block 304, a "NO" decision occurs and hence authentication between the devices 101, 103 is not successful. While not explicitly depicted, it is further assumed in FIGS. 4, 6 and 7 that the controller 120 communicates with the authenticating device 103 using the interface 115.

Attention is next directed to FIG. 4 in which the device 101 is initially switched to an "ON" state 401 (e.g. for example when the switch 119 is actuated). When the device 101, the power supply 110 is outputting a default power 403 (which may include, but is not limited to, a "0" power and/or no power), and the apparel device 105 is at least partially in the default color state 405.

In response to being turned on, the controller 120 requests authentication and/or authorization from the authenticating device 103 by transmitting (e.g. at the block 302 of the method 300) an authorization request 407 to the authenticating device 103 and starts the authorization timer 409; the authorization request 407 may include the authentication data 125. The authenticating device 103 receives the authorization request 407 and performs an authorization and/or authentication process, for example by authenticating the authentication data 125. Assuming that the authorization and/or authentication process is successful, the authenticating device 103 transmits, to the controller 120, an indication of an authorization response 411 indicating the success of the authorization and/or authentication process. The controller 120 may determine that the authorization response 411 is received (e.g. at the block 304 of the method 300) at the controller 120 within a given time period 412, as indicated by the authorization timer 409. The given timer period 412 may be configured at the controller 120, for example using the application 123.

In some embodiments, as depicted, the authenticating device 103 also requests authentication and/or authorization from the device 101 by transmitting a respective authorization request 413 to the controller 120 and starting a respective authorization timer 415. The authorization request 413 may comprise respective authentication data upon which the controller 120 may perform a respective authorization and/or authentication process (e.g. by comparing the authentication data received from the authenticating device 103 with associated authentication data stored in the memory 122, which may be similar to, or different from, the authentication data 125.

Assuming that the authorization and/or authentication process is successful, the controller 120 may optionally transmit, to the authenticating device 103, an indication of an authorization response 417 indicating the success of the authorization and/or authentication process. The authenticating device 103 may determine that the authorization response 417 is received within a given time period 418, as indicated by the authorization timer 415. The given time period 418 may be configured at the authenticating device 103, for example using an authorization application.

In any event, once the controller 120 has received the authorization response 411 and successfully (though optionally) determined the authorization and/or authentication process that authorizes/authenticates the authenticating device 103 is successful, the controller 120 (e.g. at the block 306 of the method 300) transmits a command 419 to the power supply 110 to output a given power 421 to the apparel device 105. The apparel device 105, upon receiving the given power 421, at least partially changes a color state from the default color state 405 to a given color state 423. The given power 421 may be specified in a lookup table stored at the memory 122 and/or at a memory of the power supply 110.

Figure 5:
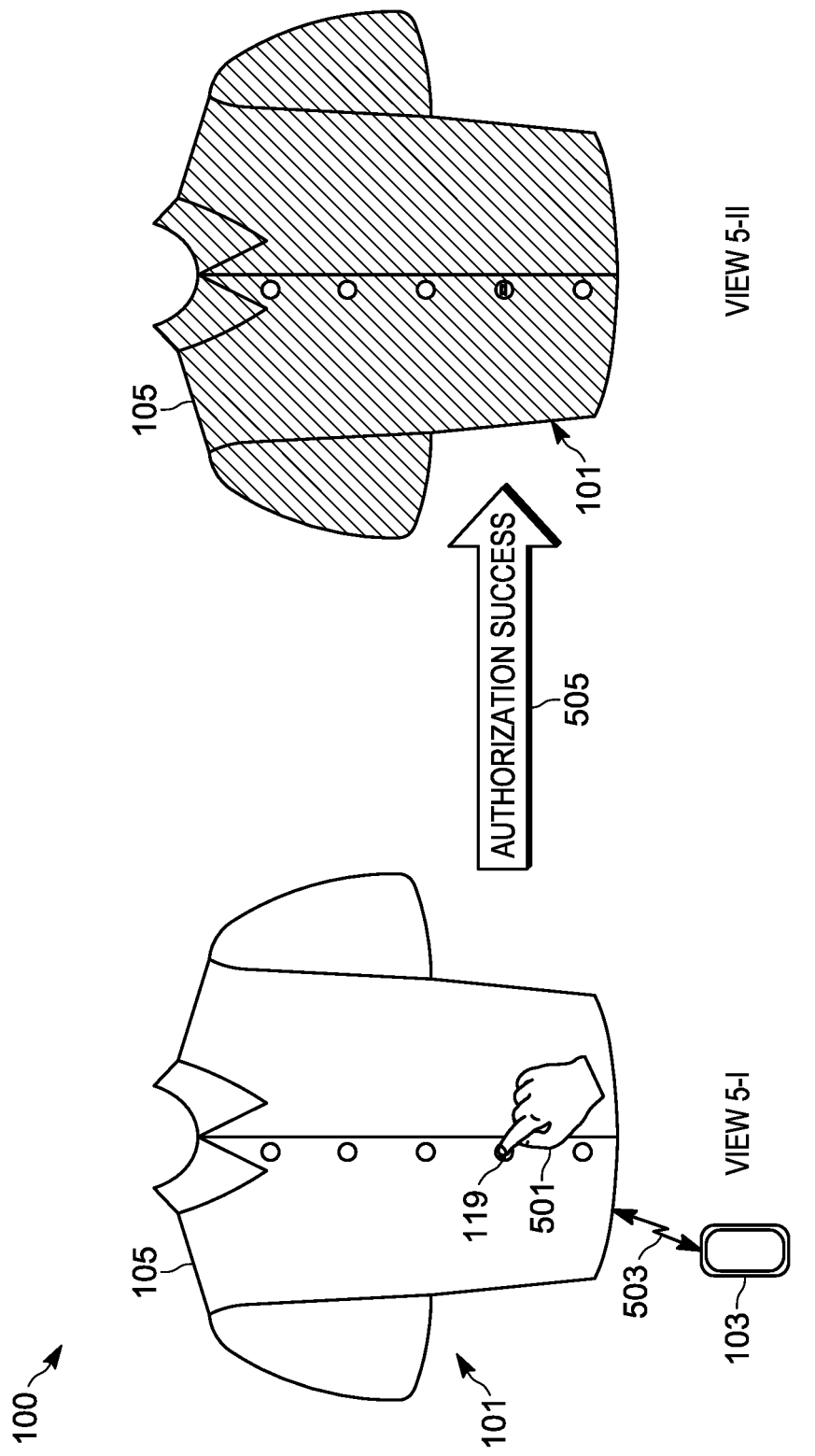
FIG. 5 shows the apparel device changing color in accordance with some embodiments.

Attention is next depicted to FIG. 5 which is substantially similar to FIG. 1, with like elements having like numbers, however FIG. 5 shows a sequence of views 5-I, 5-II to depict a successful authorization process between the devices 101, 103.

In particular, the view 5-I depicts the device 101 being turned "ON" when a finger of a hand 501 of a user actuates the switch 119, and further shows the device 101 in communication with the authenticating device 103 via a communication link 503 (e.g. a personal area network communication link) after being turned on, for example to communicate as depicted in FIG. 4.

In FIG. 5 it is further assumed that the authorization process is successful (e.g. a "YES" decision at the block 304 of the method 300), as indicated by the arrow 505 and hence the apparel device 105 changes color, as depicted in the view 5-II.

Attention is next directed to FIG. 6 which is substantially similar to FIG. 4 with like elements having like numbers. However, in contrast to FIG. 4, in FIG. 6 the controller 120 receives no response 614 from the authenticating device 103 in the given time period 412 (e.g. a "NO" decision at the block 304 of the method 300). Hence, the controller 120 (e.g. at the block 308 of the method 300) transmits a command 619 to the power supply 110 maintain the default power 403 (which may include, but is not limited to zero power and/or no power) to the apparel device 105. The apparel device 105, hence remains in the default color state 405. In some embodiments, the command 619 is optional as the power supply 110 may already be causing the apparel device 105 to be in the default color state 405.

Attention is next directed to FIG. 7 which is substantially similar to FIG. 6 with like elements having like numbers. However, in contrast to FIG. 6, in FIG. 7 the controller 120 receives an authorization response 711 from the authenticating device 103 in the given time period 412 that indicates a failed authorization and/or a denial of the request 407 and the controller 120 determines 714 that the authorization and/or the authentication has failed (e.g. a "NO" decision at the block 304 of the method 300). In other words, in the embodiment depicted in FIG. 7, the authenticating device 103 does not authorize and/or authenticate the device 101. Such a situation may occur when the authenticating device 103 has not been previously paired with the device 101, for example when a user of the device 101 selects an incorrect authenticating device 103 from a storage area.

Hence, the controller 120 (e.g. at the block 308 of the method 300) transmits a command 619 to the power supply 110 to provide and/or maintain the default power 403 to the apparel device 105. The apparel device 105 hence remains in the default color state 405. In some embodiments, the command 619 is optional as the power supply 110 may already be causing the apparel device 105 to be in the default color state 405.

Hence, as depicted in FIG. 6 and FIG. 7, the controller 120 may be further configured to, when no response to a request for an authorization to change the color state of the apparel device 105 is received, or a denial of the request is received, control the power supply 110 to cause the apparel device 105 to remain in the default color state 405.

While not depicted, the controller 120 may be further configured to transmit an alert of an authorization not being received, and the like, on one or more of a broadband and/or narrowband transceiver of the interface 115, when present, upon failure of the authorization and/or authentication process. The alert may include the location of the device 101 as determined by the location determining device 199. Furthermore, in some embodiments, the location determining device 199 remains in an off-state until failure of the authorization and/or authentication process to save battery life. Hence, the controller 120 may be further configured to: when no response to a request (i.e. for an authorization to change the color state of the apparel device 105 is received) is received or a denial of the request is received: control the power supply 110 to remain at one or more of a zero power and the default power; optionally turn on the location determining device 199; and transmit, using the communication interface 115 an alert of the authorization not being received, the alert optionally including a location of the device 101.

Figure 8:
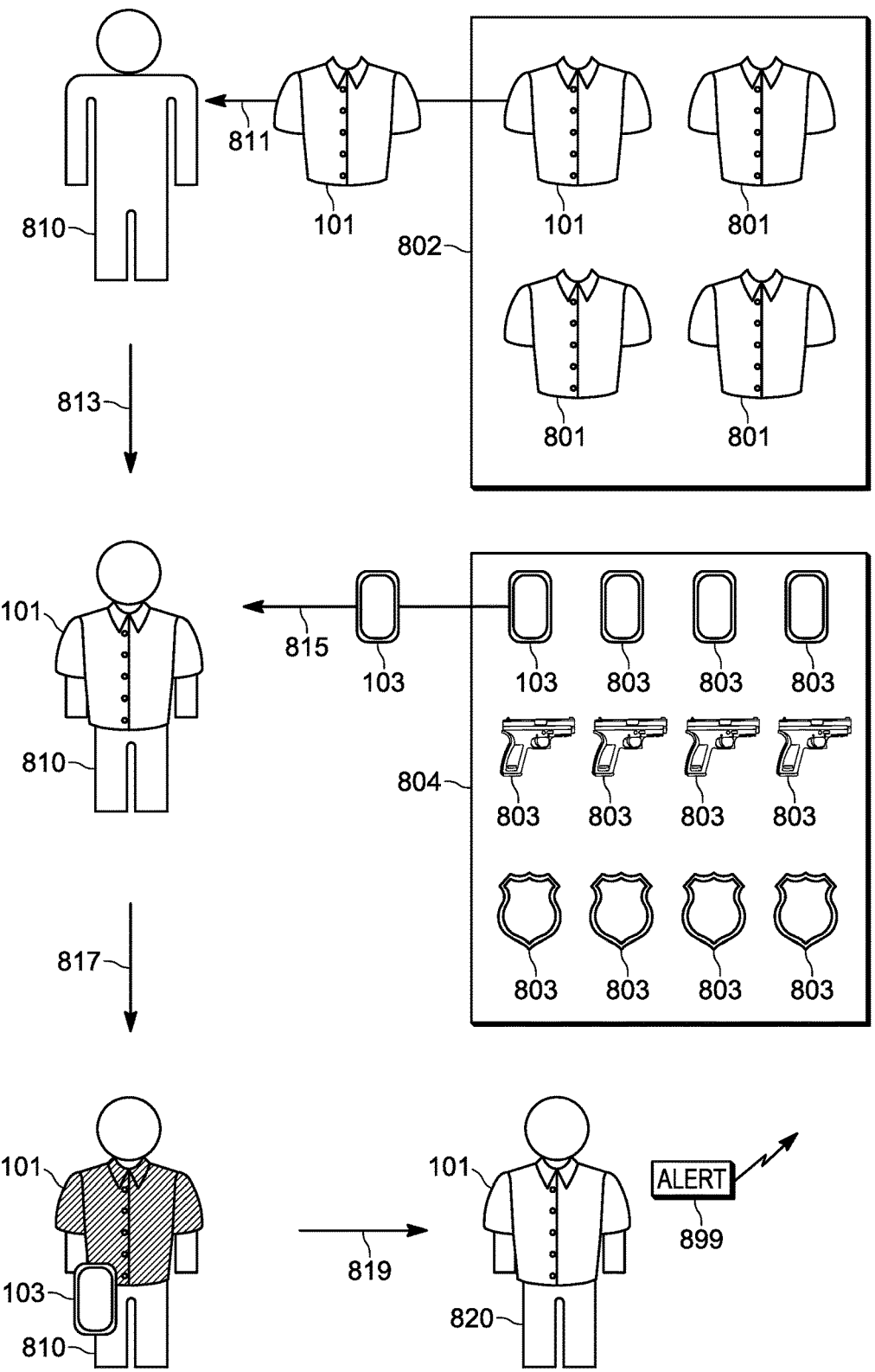
FIG. 8 shows an example use of the device of FIG. 2 in accordance with some embodiments.

Attention is next directed to FIG. 8 which depicts an example of the method 300. As depicted, the device 101 with a plurality of similar devices 801 in a uniform storage facility 802, for example at a police station and the like. The authenticating device 103 is stored with a plurality of similar authenticating devices 803 in one or more device storage facilities 804 and the like. The storage facilities 802, 804 may generally be separate from one another such that the device 101 and the authenticating device 103 are not stored together.

Furthermore, as depicted, the authenticating devices 803 include other wireless communication devices, guns and badges. In particular, each of the devices 801 may be paired with a corresponding authenticating device 803 similar to the pairing of the device 101, 103.

In any event, as depicted a user 810 may go to the uniform storage facility 802 and select the device 101 which may be specifically assigned to the user 810; as such, the device 101 may include markings (and/or may be stored in a marked area) such that the user 810 may specifically select 811 the device 101 from amongst the plurality of devices 801.

The user 810 may then proceed 813 to the device storage facility 804, for example wearing the device 101 which is initially in a default color state. Indeed, until the device 101 is in proximity to the authenticating device 103 and the authenticating device 103 authorizes and/or authenticates the device 101 to change color, the device 101 will remain in the default color state and may be recognizable as being stolen if worn outside the police station, and the like.

At the device storage facility 804, the user 810 selects 815 the authenticating device 103 which, with the device 101, may be specifically assigned to the user 810. As such, the authenticating device 103 may also include markings (and/or may be stored in a marked area) such that the user 810 may specifically select 815 the authenticating device 103 from amongst the plurality of authenticating devices 803. The markings associated with each of the devices 101, 103 such that their association may be difficult to recognize by someone attempting to steal each of the devices 101, 103.

In other words, when the user 810 is an authorized user, the user 810 may easily select the devices 101, 103; but when the user 810 is an unauthorized user, but rather is a criminal, and the like, attempting to steal the devices 101, 103, the unauthorized user will be challenged in stealing both of the paired devices 101, 103. The difficulty in stealing both of the paired devices 101, 103 increases as the respective numbers of the devices 801, 803 increases.

In any event, the user 810 then proceeds 817 to turn on the device 101 (and the authenticating device 103) which causes the method 300 to be implemented. Assuming a successful authorization, for example as described with reference to FIG. 4, the device 101 changes to the given color state.

When, at a later time, as indicated by the arrow 819, the device 101 is stolen and used by an unauthorized user 820, the device 101 may change back to the default color state, assuming that the device 101 is not in proximity to the authenticating device 103. In other words, the device 101 repeats the method 300 periodically to verify proximity to the authenticating device 103 and to receive further authorizations from the authenticating device 103 to remain in the given color state. When such further authorizations are not received, the controller 120 causes the device 101 to change back to the default color state. As also depicted in FIG. 8, the device 101 may transmit an alert 899, for example using the personal area network transceiver of the interface 115 and/or the broadband and/or narrowband transceiver of the interface 115 which may include a location of the device 101 (e.g. as determined by the location determining device 199) to alert first responders as to the location of the stolen device 101.

Hence, the device 101 and/or the method 300 may reduce deployment of security sensors and/or security overhead at the storage facilities as the apparel device 105, of the device 101 (and the respective apparel devices of the authenticating devices 803) are generally in default color state, which includes a non-authorized color state, until authorized by the authenticating device 103. The apparel device 105, of the device 101, being in the default color state hence generally acts as a deterrent to theft as the apparel device 105 being in the default and/or non-authorized color state may render the device 101 generally useless to criminals.

Figure 9:
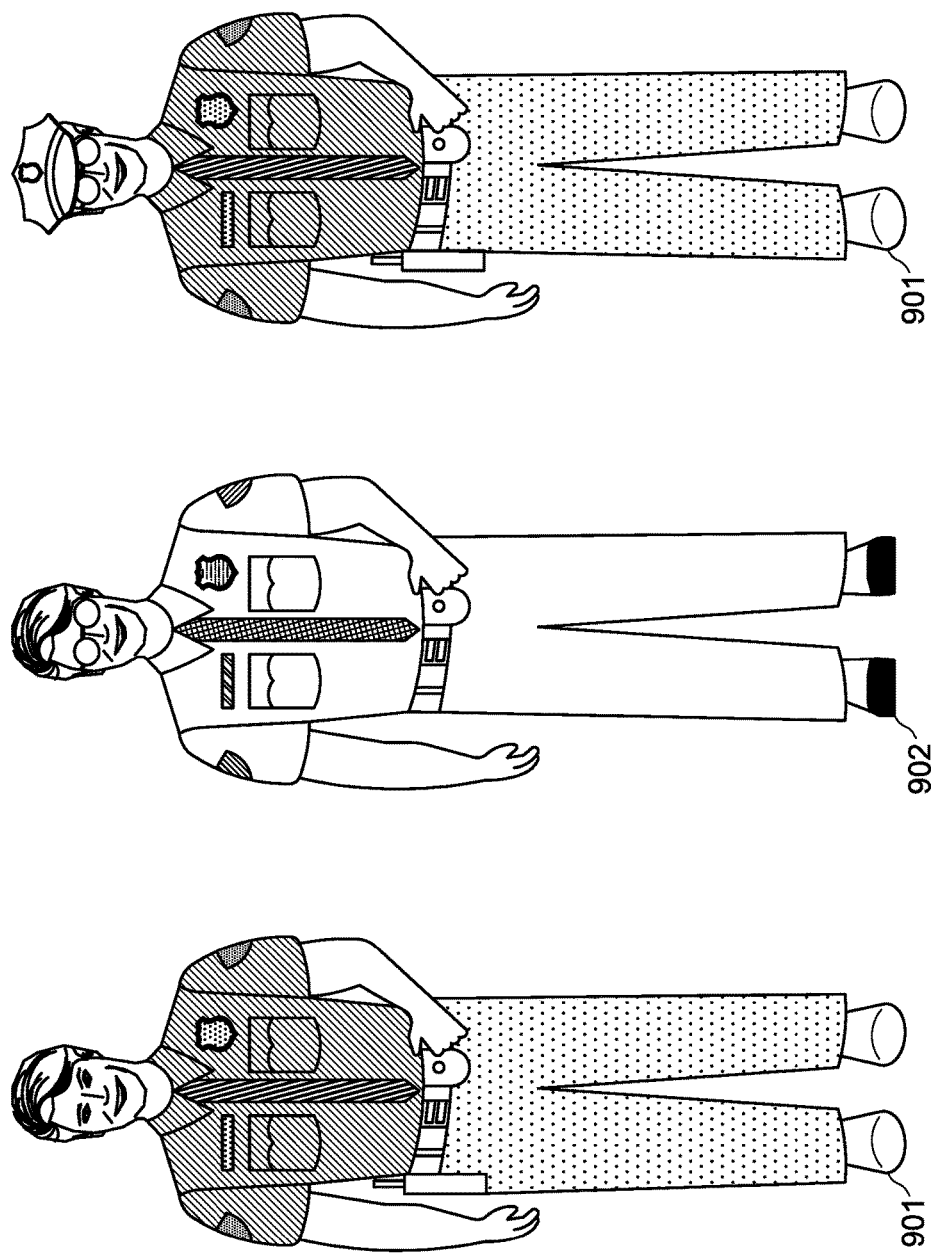
FIG. 9 shows another example use of the device of FIG. 2 in accordance with some embodiments.

For example, as depicted in FIG. 9, two police officers 901 and a malicious user 902 are wearing uniforms that are configured according to the device 101 (including, but not limited to, respective patches, badges, rank insignia, service and racing stripes and the like). The uniforms of the two police officers 901 have successfully implemented the blocks 302, 304, 306 of the method 300 (e.g. in conjunction with respective paired authenticating devices) and their uniforms (including, but not limited to, shirts, pants, shoes, ties, insignia, badges etc.) have changed to an approved color state and/or a given color state. In contrast, the uniform of the malicious user 902 implemented the blocks 302, 304, 308 of the method 300 (e.g. authentication with an authenticating device has not occurred and/or failed) and their uniform has remained in an unapproved color state and/or default color state. Hence, the malicious user 902 is visually distinguishable from the two police officers 901.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
an apparel device configured to at least partially change a color state upon a change of power;
a power supply coupled to the apparel device and configured to control the power to the apparel device;
a communication interface; and
a controller coupled to the power supply and the communication interface, the controller configured to:
transmit, to an authenticating device, using the communication interface, a request for an authorization to change the color state of the apparel device;
receive, from the authenticating device, using the communication interface, the authorization;
control the power supply to supply a given power to the apparel device, thereby changing the color state from a default color state to a given color state; and
after the apparel device has been controlled to the given color state:
transmit, to the authentication device, using the communication interface, a further request for a further authorization; and
when the further authorization is received, control the power supply to maintain the given power, and otherwise control the power supply to one or more of: stop providing power to the apparel device; and change the given power to one or more of a zero power and a default power, thereby changing the color state of the apparel device from the given color state back to the default color state.

2. The device of claim 1, wherein the apparel device is configured to at least partially change the color state upon the change of the power by changing the color state of one or more of a pattern and a symbol at the apparel device.

3. The device of claim 1, wherein the apparel device comprises one or more of fabric, clothing, a shirt, pants, a belt, gloves, a coat, a dress, a uniform, a patch, a badge, shoes, and a hat.

4. The device of claim 1, wherein the apparel device is in the default color state when the power supply is either off or initially turned on, and the given color state when the given power is supplied.

5. The device of claim 1, wherein the controller is further configured to, when no response to the request is received or a denial of the request is received, control the power supply to one or more of: stop providing power to the apparel device; and remain at one or more of a zero power and a default power.

6. The device of claim 1, wherein the controller is further configured to, when no response to the request is received or a denial of the request is received:
control the power supply to one or more of: stop providing power to the apparel device; and remain at one or more of a zero power and a default power; and
transmit, to the authentication device, using the communication interface, an alert of the authorization not being received.

7. The device of claim 1, wherein the apparel device includes at least one button, and wherein the at least one button is configured to fasten two portions of the apparel device together, and further wherein one or more of the controller and the power supply is at least partially located at the at least one button.

8. The device of claim 7, wherein the button includes a switch for operating the power supply.

9. The device of claim 1, wherein the power supply is configured to supply the given power by changing one or more of voltage and current supplied to the apparel device.

10. A method comprising:
transmitting, from a controller to an authenticating device, using a communication interface, a request for an authorization to change a color state of an apparel device, apparel device configured to at least partially change the color state upon a change of power;
receiving, at the controller from the authenticating device, using the communication interface, the authorization;
controlling, using the controller, a power supply to supply a given power to the apparel device, thereby changing the color state from a default color state to a given color state; and
after the apparel device has been controlled to the given color state:
transmitting, to the authentication device, using the communication interface, a further request for a further authorization; and
when the further authorization is received, controlling the power supply to maintain the given power, and otherwise control the power supply to one or more of: stop providing power to the apparel device; and change the given power to one or more of a zero power and a default power, thereby changing the color state of the apparel device from the given color state back to the default color state.

11. The method of claim 10, wherein the apparel device is configured to at least partially change the color state upon the change of the power by changing the color state of one or more of a pattern and a symbol at the apparel device.

12. The method of claim 10, wherein the apparel device comprises one or more of fabric, clothing, a shirt, pants, a belt, gloves, a coat, a dress, a uniform, a patch, a badge, shoes, and a hat.

13. The method of claim 10, wherein the apparel device is in the default color state when the power supply is either off or initially turned on, and the given color state when the given power is supplied.

14. The method of claim 10, further comprising, when no response to the request is received at the controller, or a denial of the request is received at the controller, controlling the power supply to one or more of: stop providing power to the apparel device; and remain at one or more of a zero power and a default power.

15. The method of claim 10, further comprising, when no response to the request is received at the controller, or a denial of the request is received at the controller:
controlling the power supply to one or more of: stop providing power to the apparel device; and remain at one or more of a zero power and a default power; and
transmitting, to the authentication device, using the communication interface, an alert of the authorization not being received.

16. The method of claim 10, wherein the apparel device includes at least one button, and wherein the at least one button is configured to fasten two portions of the apparel device together, and further wherein one or more of the controller and the power supply is at least partially located at the at least one button.

17. The method of claim 16, wherein the button includes a switch for operating the power supply.

18. The method of claim 10, wherein the power supply is configured to supply the given power by changing one or more of voltage and current supplied to the apparel device.

19. A device comprising:
- an apparel device configured to at least partially change a color state upon a change of power;
- a power supply coupled to the apparel device and configured to control the power to the apparel device;
- a communication interface; and
- a controller coupled to the power supply and the communication interface, the controller configured to:
  - transmit, to an authenticating device, using the communication interface, a request for an authorization to change the color state of the apparel device;
  - receive, from the authenticating device, using the communication interface, the authorization; and
  - control the power supply to supply a given power to the apparel device, thereby changing the color state from a default color state to a given color state,
- wherein the apparel device includes at least one button, and wherein the at least one button is configured to fasten two portions of the apparel device together, and further wherein one or more of the controller and the power supply is at least partially located at the at least one button.

20. A method comprising:
- transmitting, from a controller to an authenticating device, using a communication interface, a request for an authorization to change a color state of an apparel device, apparel device configured to at least partially change the color state upon a change of power;
- receiving, at the controller from the authenticating device, using the communication interface, the authorization; and
- controlling, using the controller, a power supply to supply a given power to the apparel device, thereby changing the color state from a default color state to a given color state,
- wherein the apparel device includes at least one button, and wherein the at least one button is configured to fasten two portions of the apparel device together, and further wherein one or more of the controller and the power supply is at least partially located at the at least one button.

* * * * *